Sept. 4, 1928.  
A. M. HAYMAKER  
1,683,181  
AUTOMATIC ANIMAL TRAP  
Filed Jan. 8, 1927    2 Sheets-Sheet 1
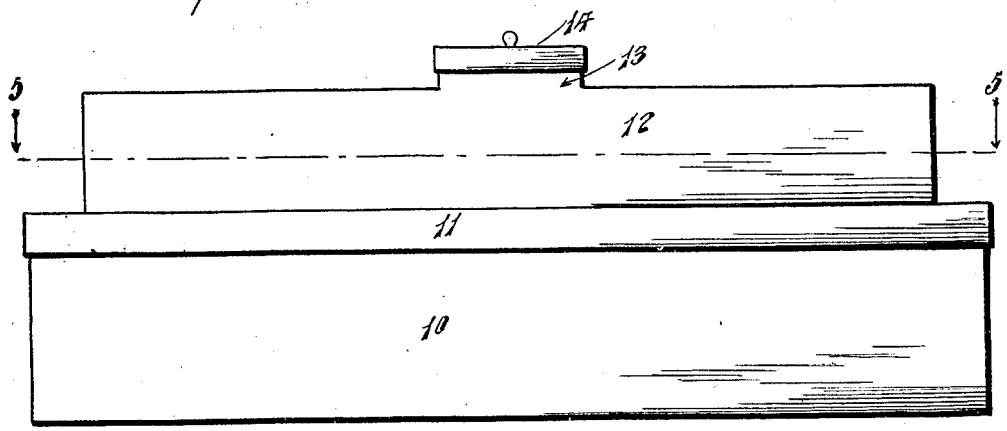
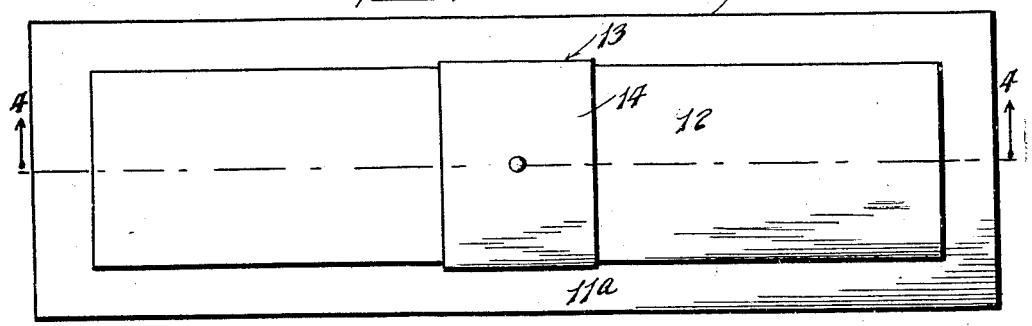
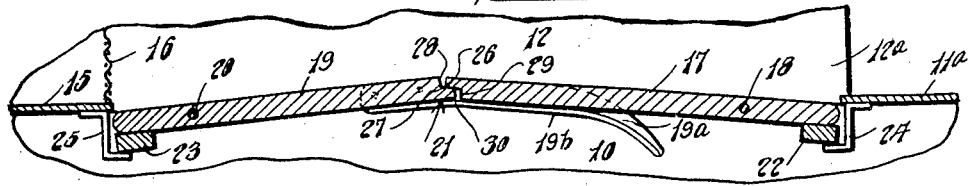
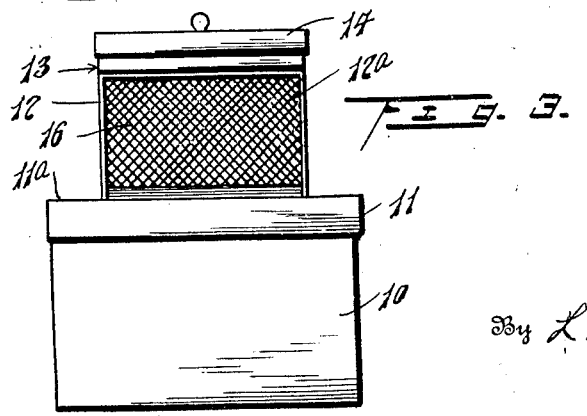
Inventor  
A. M. Haymaker  
By L. Donald Myers  
Attorney Sept. 4, 1928.
A. M. HAYMAKER
AUTOMATIC ANIMAL TRAP
Filed Jan. 8, 1927
1,683,181
2 Sheets-Sheet 2
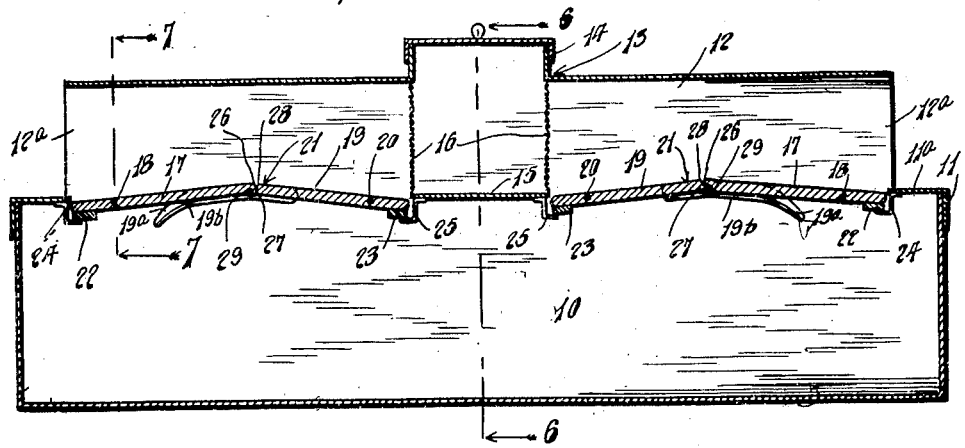
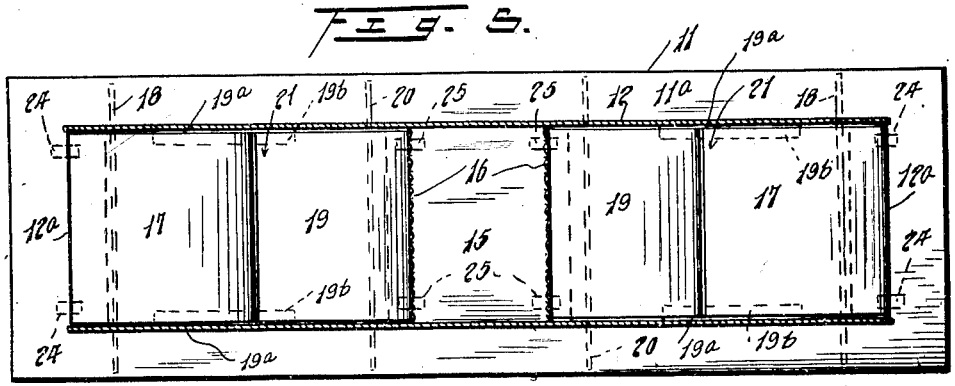
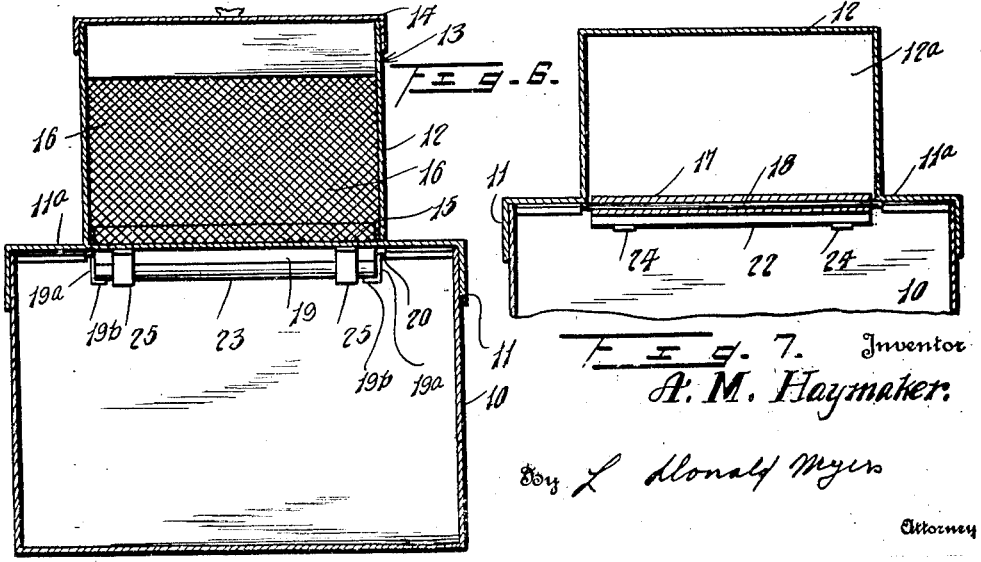
Inventor
A. M. Haymaker
By L. Donald Myers
Attorney Patented Sept. 4, 1928.

1,683,181

UNITED STATES PATENT OFFICE.

ARTHUR M. HAYMAKER, OF PITTSBURGH, PENNSYLVANIA.

AUTOMATIC ANIMAL TRAP.

Application filed January 8, 1927. Serial No. 159,841.

This invention relates to new and useful improvements in automatic animal traps.

The primary object of this invention is the provision of a simple and inexpensively manufactured trap which will be automatic in its action from the enticing, entrapping and extermination of an animal to the re-setting for further use.

A further important object of the invention is the provision of improved entrapping means which possesses novel features of construction in that it will not trip until an animal has reached a predetermined location with respect to the same and wherein the retreat of the animal is prevented by the inclusion of the portion of the structure, over which the animal has approached said predetermined point, in the entrapping structure.

Another object of the invention is to provide means for making the re-setting of the entrapping mechanism automatic in its action.

Other objects and advantages of the invention will be apparent during the course of the following description:

In the accompanying drawings forming a part of this specification and in which like numerals are employed to designate like parts throughout the same, Figure 1 is a side elevational view of the trap embodying this invention, Figure 2 is a top plan view of the trap embodying this invention, Figure 3 is an end elevational view of the trap, Figure 4 is a vertical sectional view taken on line 4—4 of Figure 2, Figure 5 is a horizontal sectional view taken on line 5—5 of Figure 1, Figure 6 is a vertical sectional view taken on line 6—6 of Figure 4, Figure 7 is a vertical sectional view taken on line 7—7 of Figure 4, and Figure 8 is a detail enlarged view showing the entrapping mechanism.

In the drawings, wherein for the purpose of illustration is shown a preferred embodiment of this invention, the numeral 10 designates a box or receptacle which forms the base of the trap and which may be made of metal, or other suitable material, and which is intended to receive an animal exterminating fluid, such as water. The open top of this box or receptacle 10 is closed by a cover 11 having suitably formed therewith or mounted thereon a double ended tunnel 12. This tunnel, at its intermediate portion, is provided with a hollow throat 13 open at its top and closed by the removable cap 14. Surrounding the double ended tunnel 12, the cover 11 is provided with the marginal platform 11$^a$. Within the confines of the intermediate portion of the double ended tunnel structure 12 and co-extensive with its throat 13, the cover 11 is formed with a floor 15, see Figs. 4 and 5.

Suitably secured to the side edges of the floor 15, throat 13 and the side walls of the intermediate portion of the tunnel 12 are the spaced wire mesh partitions 16. Figures 4 and 5 clearly show that the floor 15, the throat 13 with its cap 14 and the wire mesh partitions 16 form the bait box common to both ends of the double ended tunnel structure 12 and that the wire mesh partition 16 will permit an animal to view the bait from either end of the tunnel.

Between the bait box and each open end 12$^a$ of the tunnel, the floor of the latter is formed into an animal entrapping mechanism which will precipitate an animal into the liquid containing box or receptacle 10. Figure 8 is an enlargement of one of these entrapping mechanisms and the features of the same will be described by referring to this figure.

The entrapping mechanism includes what will be termed a primary door 17 pivoted on the fulcrum 18 and a secondary door 19 pivoted on the fulcrum 20. The adjacent end edges of these doors 17 and 19 are provided with a half joint 21. The features of this joint will be described at a later point. The outer ends of the doors 17 and 19 are provided with transversely extending weights 22 and 23. The marginal platform 11$^a$ of the cover 11 is provided with an angular stop 24 functioning to determine the set or operative position of the door 17. The bait box floor or platform 15 is provided with an angular stop 25 which determines the operative or normal position of the door 19. It will be seen that the doors 17 and 19 are normally positioned in planes which converge upwardly and that the distance between the fulcrums 18 and 20 is less than the combined longitudinal dimensions of the doors 17 and 19 from their fulcrum points to their free adjacent edges.

The half joint 21 is so constructed that the transversely extending edge 26 will engage and bind against the edge 27 of the door 19 when an animal steps upon the door 17 after passing through the open end 12ª of the tunnel. The binding engagement between the edges 26 and 27 is of such a character that as an animal passes from the door 17 onto the door 19, the latter will move downwardly with respect to the door 17 for breaking this binding action. The face 28 of the half joint 21 is cut away so that the edge 26 will not bind on any portion of the same after being freed from the edge 27 by the independent downward movement of the door 19. The faces 29 and 30 are spaced so that there will never be any binding action between the same.

It will be understood that in the re-setting of these doors 17 and 19 the door 17 must close first to permit the half joint to return to its operative position. For this reason, the door 19 is provided at each side edge with a guide arm 19ª having a downwardly turned free end and a base flange 19ᵇ, whereby, the door 17 will be forced to return to its set position first by its engagement with the arms 19ª and their base flanges.

It now will be understood that as the weight of the animal is transferred from the door 17 to the door 19 the latter will move downwardly independently of the door 17 and the binding between the edges 26 and 27 will be discontinued. After the initial independent downward movement of the door 19, both doors will be free to pivot and all support for the animal will be removed, whereby retreat to the tunnel entrance 12ª will be prevented.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a device of the type described, a base of receptacle form, a cover for the base, a tunnel carried by the base, a bait box in the tunnel, an opening in the cover within the tunnel between the entrance for the tunnel and the bait box, and entrapping mechanism within the confines of the cover opening for precipitating an animal into the base, said mechanism including a pair of pivoted doors which engage each other at their adjacent edges to prevent pivoting while the weight of an animal is entirely upon one of said doors, said door edges being freed from each other by the transfer of the weight of the animal to the second door.

2. In a device of the type described, a base of receptacle form, a cover for the base, a tunnel carried by the base, a bait box in the tunnel, an opening in the cover within the tunnel between the entrance for the tunnel and the bait box, and entrapping mechanism within the confines of the cover opening for precipitating an animal into the base, said mechanism including a pair of upwardly converging, pivoted doors formed with a lap joint at their adjacent edges, the combined lengths of the doors between their pivotal axes being greater than the distance between said axes whereby the doors will support each other by means of said lap joint to prevent pivoting while the weight of an animal is entirely upon one of said doors, said doors being disconnected from each other by the transfer of the weight of the animal to the second door.

3. In a device of the type described, a base of receptacle form, a cover for the base, a tunnel carried by the base, a bait box in the tunnel, an opening in the cover within the tunnel between the entrance for the tunnel and the bait box, entrapping mechanism within the confines of the cover opening for precipitating an animal into the base, said mechanism including a pair of upwardly converging, pivoted doors formed with a lap joint at their adjacent edges, the combined lengths of the doors between their pivotal axes being greater than the distance between said axes whereby the doors will support each other by means of said lap joint to prevent pivoting while the weight of an animal is entirely upon one of said doors, said doors being disconnected from each other by the transfer of the weight of the animal to the second door, and means for returning the doors to their set positions in proper sequence.

4. In a device of the type described, a base of receptacle form, a cover for the base, a tunnel carried by the base, a bait box in the tunnel, an opening in the cover within the tunnel between the entrance for the tunnel and the bait box, entrapping mechanism within the confines of the cover opening for precipitating an animal into the base, said mechanism including a pair of upwardly converging, pivoted doors formed with a lap joint at their adjacent edges, the combined lengths of the doors between their pivotal axes being greater than the distance between said axes whereby the doors will support each other by means of said lap joint to prevent pivoting while the weight of an animal is entirely upon one of said doors, said doors being disconnected from each other by the transfer of the weight of the animal to the second door, means for returning the doors to their set positions in proper sequence, and means for determining the normal positions of the doors.

5. In a device of the type described, an animal entrapping mechanism including a pair of pivoted doors which bind against each other at their adjacent edges to prevent pivoting while the weight of an animal is entirely upon one of said doors, said door edges being freed from each other by the transfer of the weight of the animal to the second door.

6. In a device of the type described, an animal entrapping mechanism including a pair of pivoted doors converging upwardly and formed with a lap joint at their adjacent edges, the combined lengths of the doors between their pivotal axes being greater than the distance between said axes, whereby the doors will support each other by means of said lap joint to prevent pivoting while the weight of an animal is entirely upon one of said doors, said doors being disconnected from each other by the transfer of the weight of the animal to the second door.

In testimony whereof, I affix my signature.

ARTHUR M. HAYMAKER.